US009022249B2

United States Patent
Ranade

(10) Patent No.: US 9,022,249 B2
(45) Date of Patent: May 5, 2015

(54) THERMALLY INSULATED POLYURETHANE SHIPPER AND METHOD OF MAKING SAME

(71) Applicant: Sonoco Development, Inc., Hartsville, SC (US)

(72) Inventor: Ajit Ranade, Naperville, IL (US)

(73) Assignee: Sonocco Development, Inc., Hartsville, SC (US)

( * ) Notice: Subject to any disclaimer, the term of this patent is extended or adjusted under 35 U.S.C. 154(b) by 0 days.

(21) Appl. No.: 13/919,561

(22) Filed: Jun. 17, 2013

(65) Prior Publication Data

US 2014/0367393 A1    Dec. 18, 2014

(51) Int. Cl.
     *F25D 3/08*      (2006.01)
     *B65D 81/38*    (2006.01)

(52) U.S. Cl.
     CPC ........ *B65D 81/3823* (2013.01); *B65D 81/3825* (2013.01)

(58) Field of Classification Search
     CPC .................. B65D 81/3825; B65D 81/3823
     USPC ................ 220/592.25; 62/371, 457.2, 530; 229/103.11
     See application file for complete search history.

(56) References Cited

U.S. PATENT DOCUMENTS

| | | | |
|---|---|---|---|
| 3,327,882 A * | 6/1967 | Andrews | 220/4.28 |
| 6,325,281 B1 * | 12/2001 | Grogan | 229/103.11 |
| 6,381,981 B1 | 5/2002 | Yaddgo et al. | |
| 6,765,031 B2 | 7/2004 | Salyer et al. | |
| 7,908,870 B2 | 3/2011 | Williams et al. | |
| 7,913,511 B2 | 3/2011 | Meyer et al. | |
| 8,424,335 B2 | 4/2013 | Corder et al. | |
| 2003/0082357 A1 | 5/2003 | Gokay et al. | |
| 2003/0234255 A1 | 12/2003 | Hagopian et al. | |
| 2010/0301057 A1 * | 12/2010 | Tattam et al. | 220/592.25 |
| 2010/0326993 A1 | 12/2010 | Mayer et al. | |

FOREIGN PATENT DOCUMENTS

| | | |
|---|---|---|
| EP | 0660057 B1 | 11/1994 |
| EP | 2022727 A1 | 8/2007 |
| WO | WO-2011/046940 A1 | 4/2011 |

\* cited by examiner

*Primary Examiner* — Fenn Mathew
*Assistant Examiner* — Elizabeth Volz
(74) *Attorney, Agent, or Firm* — Miller, Matthias & Hull LLP

(57) ABSTRACT

A thermally insulated sandwich polyurethane (PUR) shipper for a temperature sensitive payload is provided. The sandwich PUR shipper comprises an outer corrugated box, an inner corrugated box, vacuum insulated panels (such as VIP panels) and PUR foam. The inner box is nested within the outer box and has a bottom, sides and a top. The inner box defines a payload compartment. The VIP panels are adhered to the outer facing surfaces of the inner box. Preferably the VIP panels are wedged against each other so that a side edge of one VIP panel abuts an adjacent VIP panel. The PUR foam fills the space between the VIP panels and the outer box. The PUR foam may cover the top edges of the VIP panels.

4 Claims, 10 Drawing Sheets

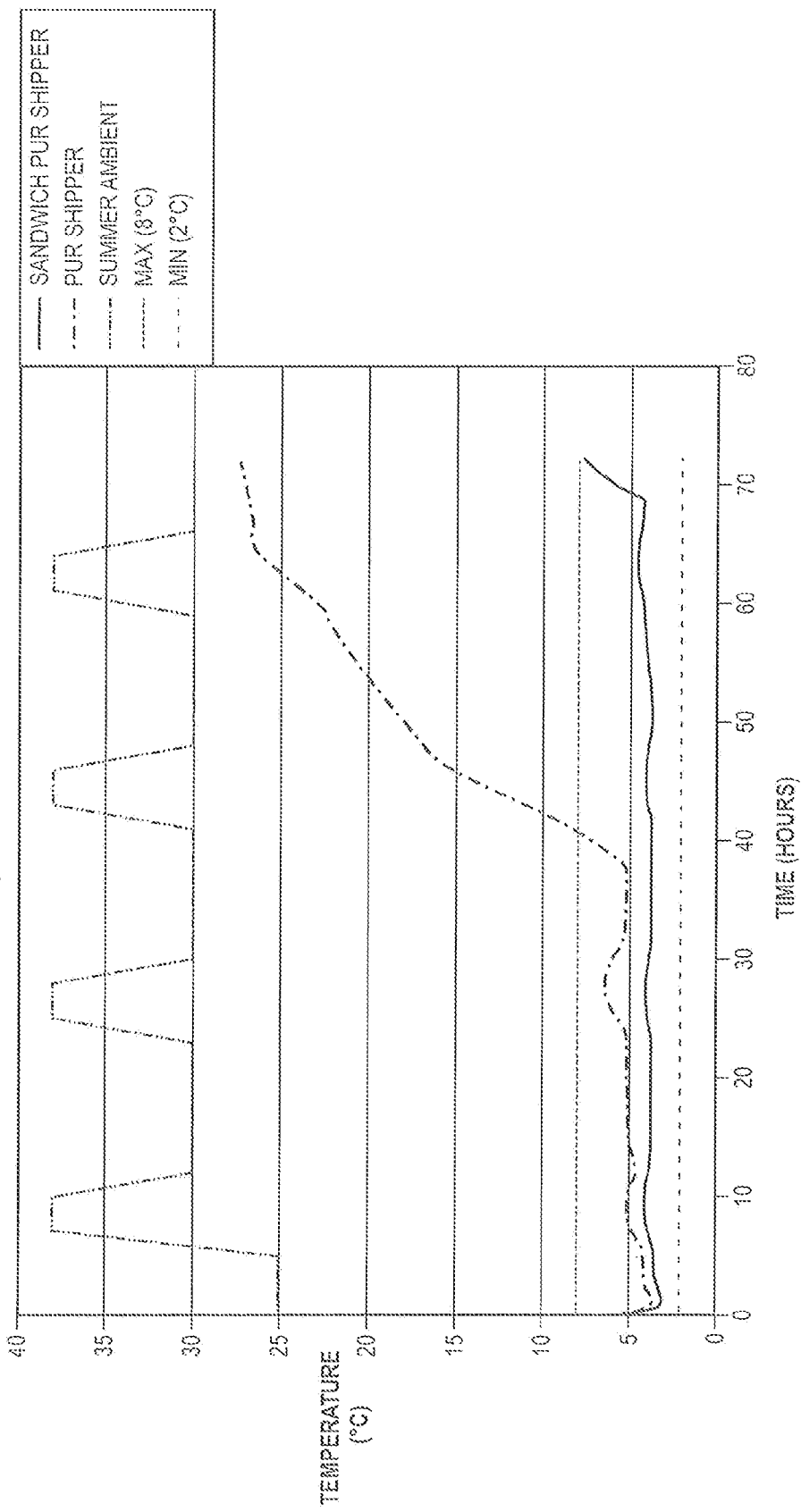

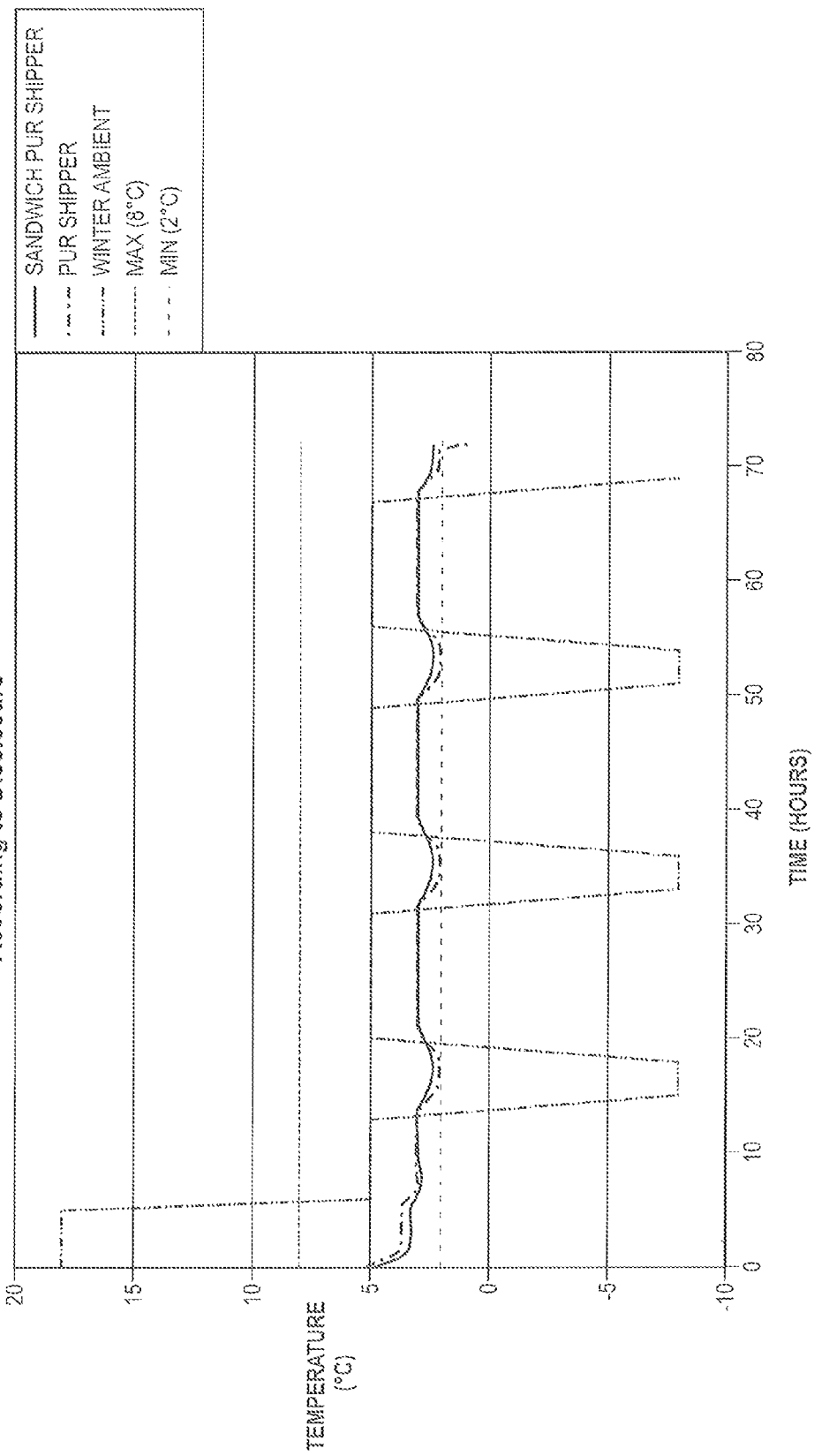

THERMALLY INSULATED POLYURETHANE SHIPPER AND METHOD OF MAKING SAME

FIELD OF THE INVENTION

This invention relates to a thermally insulated sandwich polyurethane (PUR) shipper for shipping temperature sensitive payloads. More particularly, this invention relates to a thermally insulated sandwich PUR shipper for shipping temperature sensitive payloads that avoids the disadvantages of other insulated containers while affording additional structural and operating advantages.

DESCRIPTION OF THE RELATED ART

Thermally insulated shippers are used to ship perishable materials such as pharmaceuticals, blood and blood products, transplant organs and food products which must be maintained within a certain temperature range. The shipping and transportation of various perishable materials frequently requires that such materials be maintained in a stable temperature range either higher or lower than the ambient temperatures to which the packaging will be exposed. A number of different types of thermally insulated containers have been developed for this purpose. They generally fall into two main categories, active shippers and passive shippers.

Active shippers are those in which the internal temperature is controlled using a battery operated device or electrical power cord. These systems usually are expensive and quite bulky.

Passive shippers are those in which the internal temperature is maintained without any battery or electrical support. Different materials may be used to control the temperature, such as phase change material (material which can absorb or release heat depending on the surrounding temperature), gel bricks (a.k.a. ice bricks), vaccum insulation panels and dry ice.

There are at least three types of passive shippers:

1. EPS shippers. EPS shippers are made out of expanded polystyrene foam (EPS) and may use a combination of other components such as a corrugated box, vacuum insulation panels, phase change materials, gel bricks and dry ice. Expanded foam shippers can also be made out of other types of expanded foam including but not limited to expanded polypropylene (EPP), expanded polystyrene(EPS) and expanded polyethylene (EPE).

2. Vacuum Insulated Panel (VIP) shippers. A vacuum insulated panel is a product composed of a rigid, highly-porous nano size material core made from fused silica, aerogel, or glass fiber that is surrounded by a metalized or non-metalized plastic film enclosure that is vacuum packed and nearly hermetically sealed so as to remove any remnant air particles within the enclosure. The principal reason why VIP panels are highly sought after as material for use in insulation is due to their exceptionally high thermally insulating properties. For example, EPS and polyurethane, which are typical insulating materials, have an R-value of about 4 to 4.5 and 5 to 6 hr-ft$^2$-° F./BTU-in respectively, whereas the R-value for a VIP panel of the same thickness is typically 35-40 hr-ft$^2$-° F./BTU-in or more. In order for EPS or polyurethane to be as effective as a VIP panel, the same EPS or polyurethane sheets would need to be made about seven or eight times thicker. An open topped box of VIP panels can be made from five individual panels taped together using packaging tape or strapped together using band straps.

3. Polyurethane (PUR) shippers. PUR shippers are made by adding a liquid PUR mix (a mixture of isocyanate, polyol, catalysts, blowing agents) into a corrugated box and then curing (foaming) the liquid to create PUR foam. The PUR foam can be made in different densities and hardnesses.

The use of most if not all of these passive shippers involves a number of challenges:

Edge Leaks in VIP Shippers

A typical VIP shipper is made by assembling five individual VIP panels and securing the panels together using packaging tape or strapping them together using band strap. Despite the care given to assembly, there can be significant air gaps (edge leaks) formed between the VIP panels during the assembly. These gaps are difficult to eliminate due to the often uneven shape of the VIP panels around the edges. Even though individual VIP panels may have an R-value of up to 40/inch, the overall shipper R-value may be anywhere between 25 to 30, a 25-30% drop. The drop in R-value is due to the edge leaks. This is also one of the main reasons packaging system consisting essentially of VIP panels are having difficulty being successful in the insulated shipper market. They are expensive, and their insulative benefits are greatly compromised due to edge leaks.

Edge leaks in general occur when two adjoining walls of material are not completely in contact/flush with one and another and therefore create a visible gap, also known as a thermal bridge. This thermal bridge creates a path of least resistance for heat to transfer through, thus making all even high R-value materials ineffective at preventing thermal transmissions. The R-value of the entire system is compromised and languishes to levels of systems with no VIP panels. Simply adding additional thermal insulation to enclosure is of little benefit; the thermal bridge must be minimized or eliminated completely in order for the system's R-value to be substantially enhanced.

The majority of air leaks arise in circumstances where manual labor is used to assemble the final product and where the mating surfaces of the components being connected together are irregularly shaped or highly unrefined. (Edge gaps can significantly widen during the standard transportation resulting in further reduction of shipper R-value.) Because the edge leaks are predominantly a function of the production control process of the particular product being manufactured, it is greatly desired that the manufacturing operations have as tight control as possible of the tolerances and procedures as cost allows. This in turn means that all manual operations should ideally be eliminated or controlled in such a way that the assembler's own experience does not weight heavily upon the final quality of the product.

Knife Defects, Puncture Defects in VIP Shippers

Vacuum (lack of gas molecules) is the primary reason why the R-value of VIP panels are so high. The outside casing of these panels is made up of flexible plastic film. The R-value of VIP panel without a vacuum is about 4/inch and this similar to EPS. If a VIP panel gets damaged due to puncture or rough handling then the R-value drops due to the loss of the vacuum. The R-value will also drop over time because the flexible plastic film is not completely impermeable to gas and moisture. However, the most common defect in shipping container that comprise VIP panels is the compromise of the flexible plastic film due to punctures or tears. VIP shippers typically are enclosed in a cardboard box. Extra care needs to be taken during unpacking and opening the box. A knife blade can easily puncture the flexible plastic film resulting in a significant drop in the R-value from 40 to 4/inch. The entire shipper will fail even if the failure is just in one VIP panel.

Manual Labor Requirements in VIP Shippers

As briefly mentioned above, the method currently used to create VIP boxes demands heavily upon manual manipulation, an inexact operation, where the individual panels are joined by the individual to hold the individual panels temporarily into place while wrapping and attaching adhesive bindings such as tape or straps to compress the panels together, a requirement that is dictated by the need to minimize edge leaks. Because there currently are no technologies to instantly determine what the operating R-value is of the final package, or even in a relatively short period of time, there is no reliable method to ensure the thermal quality of the final product. Due to such shortcomings, a more repeatable and controlled method is desired.

Transportation Considerations in VIP Shippers

Transportation and the resulting vibrations that occur during transporting are important factors to consider when selecting appropriate packaging needs. With current manually produced VIP panel packages, the risk of compromising the R-value properties of the package is high, especially when the package undergoes severe shock or changes in momentum, such as when falling or wildly translating about a shelf on a vehicle. Manually constructed VIP packages that are held together with adhesive tape or another binding system that was never designed to absorb impact or loads of any kind present a particular challenge. Excessive vibration or impacting of a package with a large enough amplitude during transportation can and often does create edge leakage due to air gaps between the VIP panels that deleteriously affects the performance of such packaging systems. Requiring couriers to be more gentle or use greater care when handling the package is usually beyond the control of the package maker or user. By designing a package to create a more robust and sturdy structure, the problems associated with transportation and vibration can be mitigated or even eliminated.

PUR shippers are widely used in the pharmaceutical and medical industries to ship drugs and medical related products all over the world. The primary advantage of a PUR shipper over an EPS shipper is the higher insulation (R) value. Insulating properties of PUR (R-value of 6/inch) are 50% better than EPS (R-value of 4/inch).

Standard PUR shippers used in the pharmaceutical and medical shipping industries are made with 2-3" of wall thickness. Depending on the size of payload and type of refrigerants used inside the box, PUR shippers are bulky and the total weight of the shipper (including payload and refrigerants) can easily reach 40-50 lbs. Size and weight are two primary factors impacting the cost in a shipping industry. The present invention is designed to solve the problems described above.

BRIEF SUMMARY OF THE INVENTION

The present invention is an improved thermally insulated sandwich PUR shipper which avoids the disadvantages of prior insulated containers while affording additional structural and operating advantages. The present invention is also a method of making an improved thermally insulated sandwich PUR shipper.

In one aspect the invention is a packaging system for shipping a temperature sensitive payload, the packaging system comprising an outer corrugated box, an inner corrugated box, insulating panels and PUR foam. The inner box is nested within the outer box and has a bottom, sides and a top. The inner box defines a payload compartment. The bottom and sides of the inner box have outer facing surfaces facing away from the payload compartment. The insulating panels are adhered to the outer facing surfaces of the inner box. The PUR foam fills the space between the insulating panels and the outer box. Preferably the insulating panels are wedged against each other so that a side edge of one insulating panel abuts an adjacent insulating panel. The PUR foam may cover the top edges of the insulating panels.

The insulating panels may be VIP panels or any other suitable panel made of insulation material (instead of VIP) with insulation values (R-values) equal to or greater than the PUR foam. In some instances the R-values of the insulation panels may be twice that of the PUR foam or even higher.

In another aspect of the invention a method of making a sandwich PUR shipper is provided. The method may comprise the steps of:

Step 100: Providing an inner box having a bottom and four sides. This step may include mounting the inner box upside down on a tool.

Step 102: Adhering an insulating panel such as a VIP panel to the outer facing side of at least one of the inner box bottom and sides to create an inner box assembly.

Step 104: Positioning an outer box around the inner box assembly so that there is a gap between the outer box and the inner box assembly. If the method is being performed using a tool, this step may include using the tool to hold the outer box steady so that it does not contact the inner box assembly.

Step 108: Pouring liquid polyurethane into the gap.

Step 110: Foaming the liquid polyurethane. This step may include covering the insulating panels with PUR foam.

In a tool is used, after Step 104 and before Step 108 the method may comprise the further step of:

Step 106: Inverting the tool 180 degrees so that the nested boxes are now right side up.

BRIEF DESCRIPTION OF THE DRAWINGS

FIG. 11 is a graph comparing the thermal performance of a sandwich PUR shipper according to the disclosure to a PUR shipper for a summer ambient profile.

FIG. 12 is a graph comparing the thermal performance of a sandwich PUR shipper according to the disclosure to a PUR shipper for a winter ambient profile.

DETAILED DESCRIPTION OF THE INVENTION

Figure 1:
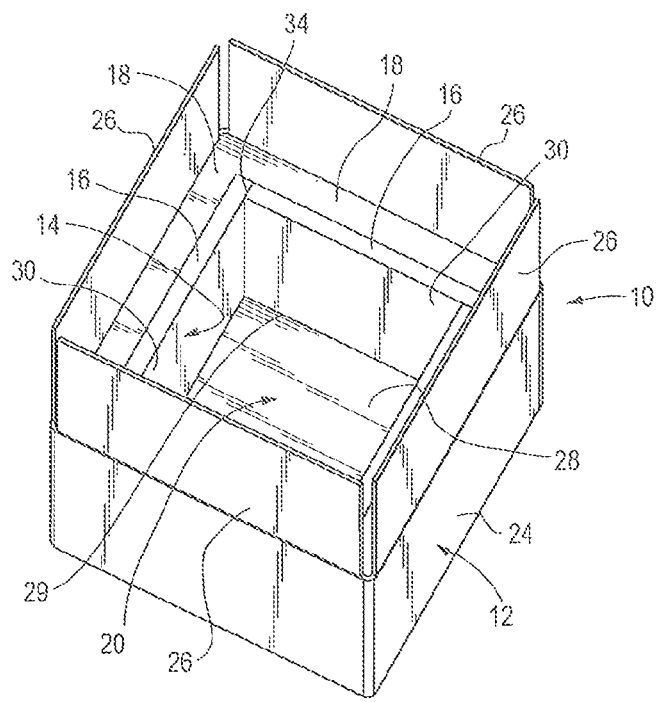
FIG. 1 is a perspective view of a thermally insulated sandwich PUR shipper according to the invention.

While this invention may be embodied in many forms, there is shown in the drawings and will herein be described in detail one or more embodiments with the understanding that this disclosure is to be considered an exemplification of the principles of the invention and is not intended to limit the invention to the illustrated embodiments. For instance, while the sandwich PUR shipper of the disclosure will now be described as comprising VIP panels, it should be understood that the insulating panels can be any suitable insulating panel.

The term R-value as used herein refers to the resistance of a material to heat flow, and typically is expressed in units of hr-ft$^2$-°F./BTU-in, referring to the thermal resistance of a material that is a nominal one inch thick. Where units are not explicitly provided, the R-value should be understood to be in units of hr-ft$^2$-°F./BTU-in.

The Thermally Insulated Sandwich PUR Shipper

The invention is a thermally insulated sandwich polyurethane (PUR) shipper for shipping a temperature sensitive payload and a method of making the same.

Turning to the drawings, FIG. 1 is a perspective view of a sandwich PUR shipper 10 according to one aspect of the invention. The sandwich PUR shipper 10 comprises an outer box 12, an inner box 14 nested within the outer box 12, insulating panels such as vacuum insulated panels (VIP panels) 16 adhered to the exterior sides and bottom (outer facing surfaces) of the inner box 12, and PUR foam 18 located between the VIP panels 16 and the outer box 18. The top 32 of the inner box 14 has been removed for clarity.

The insulating panels may be VIP panels or any other suitable panel made of insulation material (instead of VIP), preferably with an insulation value (R-value) equal to or greater than the PUR foam. In some instances the R-value of the insulation panels may be about twice that of the PUR foam or even higher. For example, VIP panels may have an R-value of about 35 to 40, much higher than the typical R-value of 5 to 6 for PUR foam.

Figure 2:
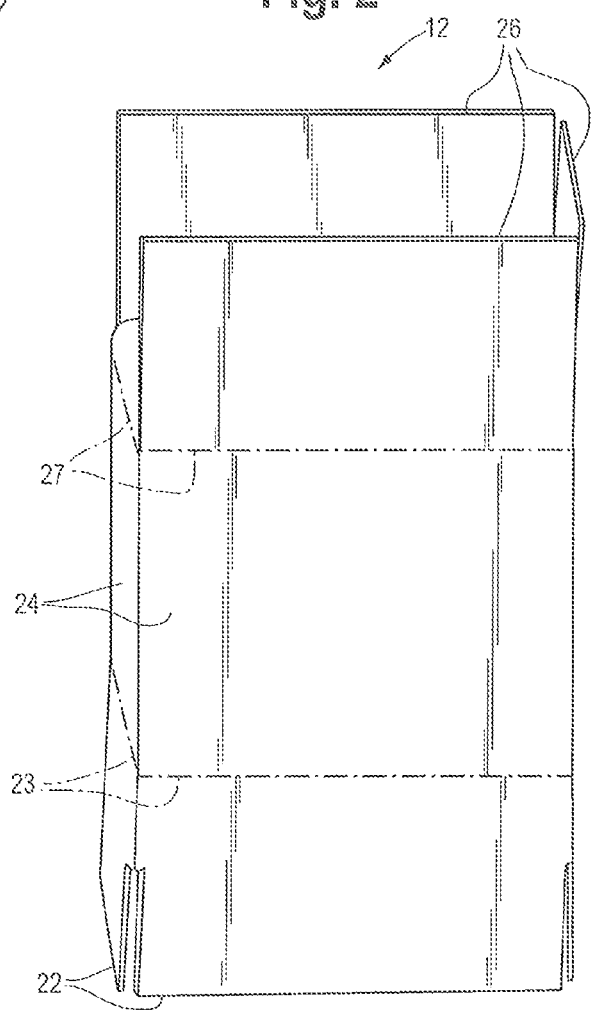
FIG. 2 is a perspective view of an outer corrugated box used in making the thermally insulated sandwich PUR shipper of FIG. 1.

FIG. 2 is a perspective view of an outer box 12 used as a component of the sandwich PUR shipper 10 of FIG. 1. Preferably the outer box 12 is made of corrugated and comprises bottom flaps 22 that form the bottom 22 of the outer box 12, four side panels 24 extending from the periphery 23 of the bottom 22 to the top periphery 27, and a top 26 comprised of top flaps 26 foldably attached to the side panels 24 along the top periphery 27.

Figure 3:
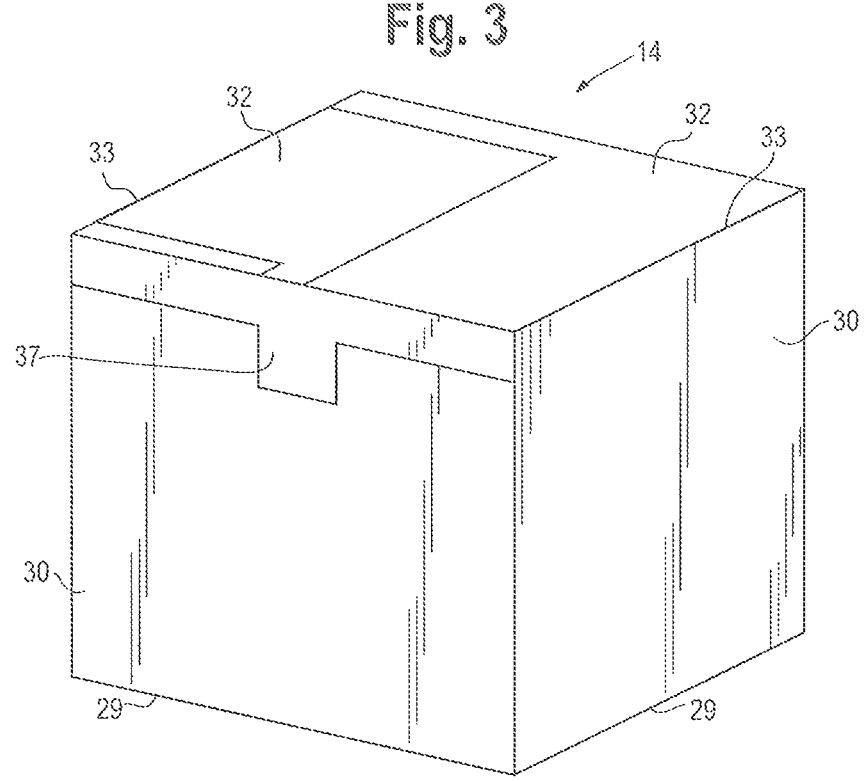
FIG. 3 is a perspective view of an inner box used as a component of the sandwich PUR shipper 10 of FIG. 1.

FIG. 3 is a perspective view of an inner box 14 used as a component of the sandwich PUR shipper 10 of FIG. 1. Preferably the inner box 14 is made of corrugated and comprises a bottom 28 having a bottom periphery 29, four side panels 30 extending from the periphery 29 of the bottom 28 to a top peripihery 33, and a top 32 comprised of top flaps 32 foldably attached to the side panels 30 along a top periphery 33. The top flaps 32 may be folded together to close the inner box 14. The inner box 14 may be sealed with tape 37 or other suitable means.

The inner box 14 is smaller than the outer box 12 so that the inner box 14 can nest within the outer box 12, leaving a gap therebetween for accommodating the VIP panels 16 and the PUR foam 18. The inner box 14 defines an interior space 20 (FIG. 1) for holding a payload.

Figure 4:
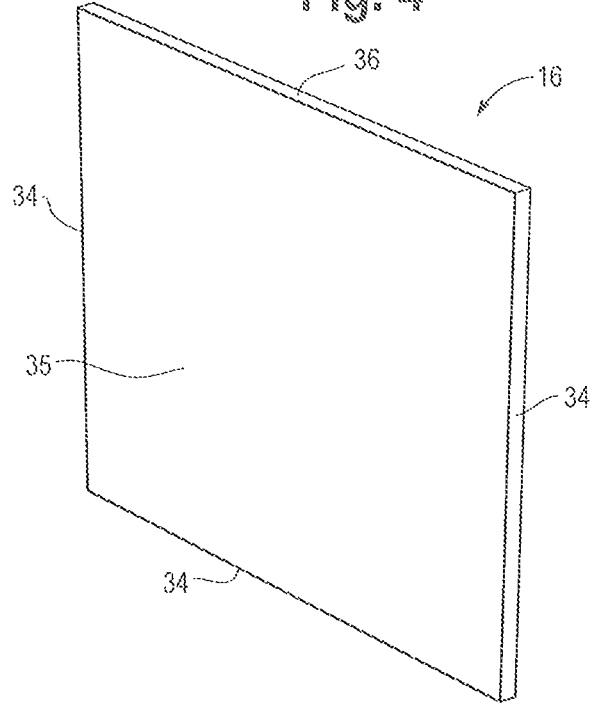
FIG. 4 is a perspective view of a VIP panel used as a component of the sandwich PUR shipper 10 of FIG. 1.

The VIP panels 16 may generally be composed of a rigid, highly-porous, nano-size material core made from fused silica, aerogel, or glass fiber, surrounded by a plastic film enclosure that is vacuum packed and nearly hermetically sealed so as to remove any remnant air particles within the enclosure. As shown in FIG. 4, each VIP panel 16 is generally rectilinear in shape, somewhat like a flattended brick, with two flat sides 35, three substantially flat side edges 34 and a substantially flat top edge 36. Each vacuum insulated panel 16 may be oriented substantially orthogonally to at least one adjacent vacuum insulated panel 16 and have one or more edges 34 that abut the adjacent vacuum insulated panels 16.

Figure 10:
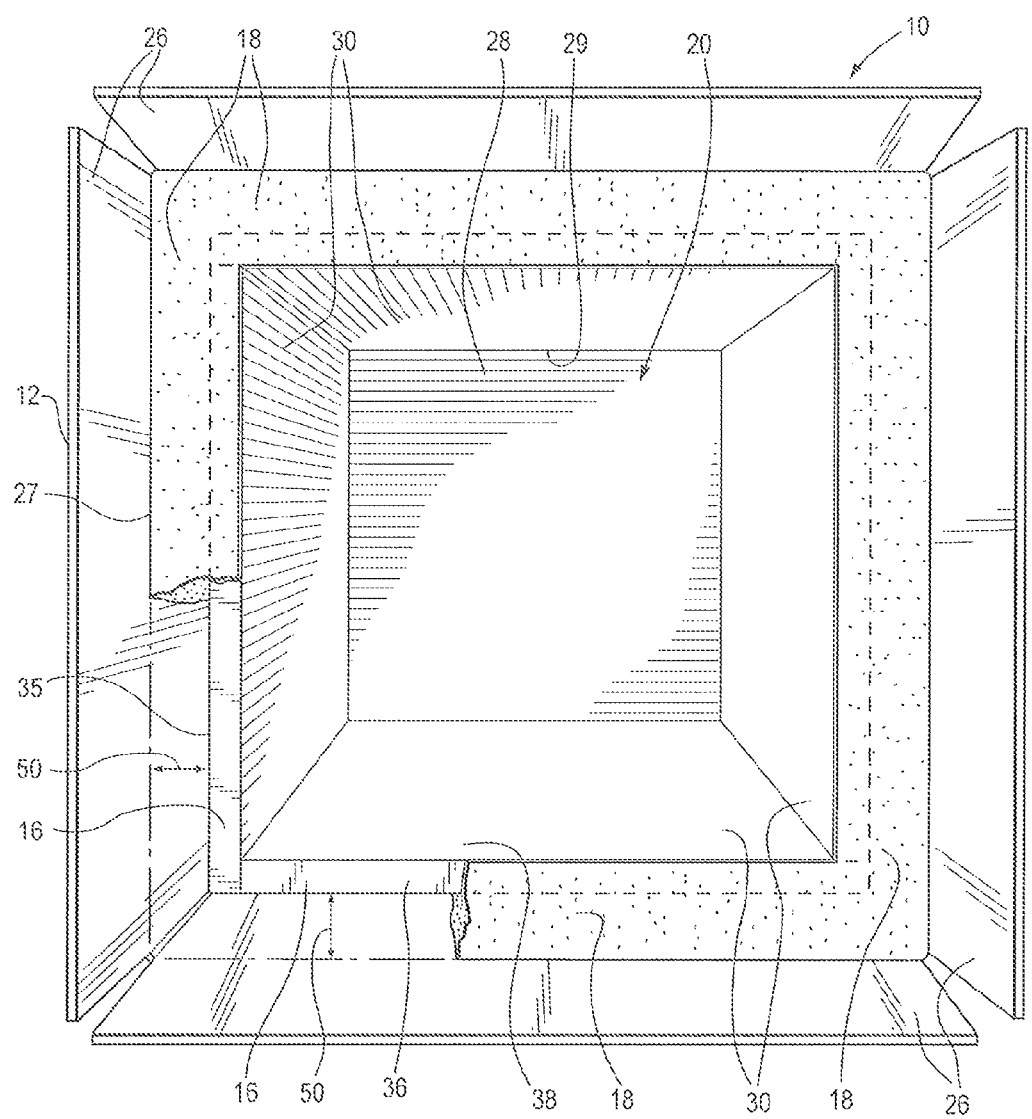
FIG. 10 is a top perspective view of a completed sandwich PUR shipper shown with some of the PUR foam removed for clarity.

Referring back to FIG. 1, the VIP panels 16 are located between the nested outer box 12 and inner box 14 and, more specifically, between the PUR foam 18 and the inner box 14, which protects the VIP panels 16 from punctures or tearing. Preferably the VIP panels 16 are wedged against each other together so that the side edge 34 of one VIP panel 16 abuts an adjacent VIP panel 16, thereby reducing or eliminating edge leaks. The PUR foam 18 may cover the top edges 36 of the VIP panels 16 to seal off the VIP panels 16 so they are completely enclosed as shown in FIG. 10.

Method of Making the Sandwich PUR Shipper

Figure 5:
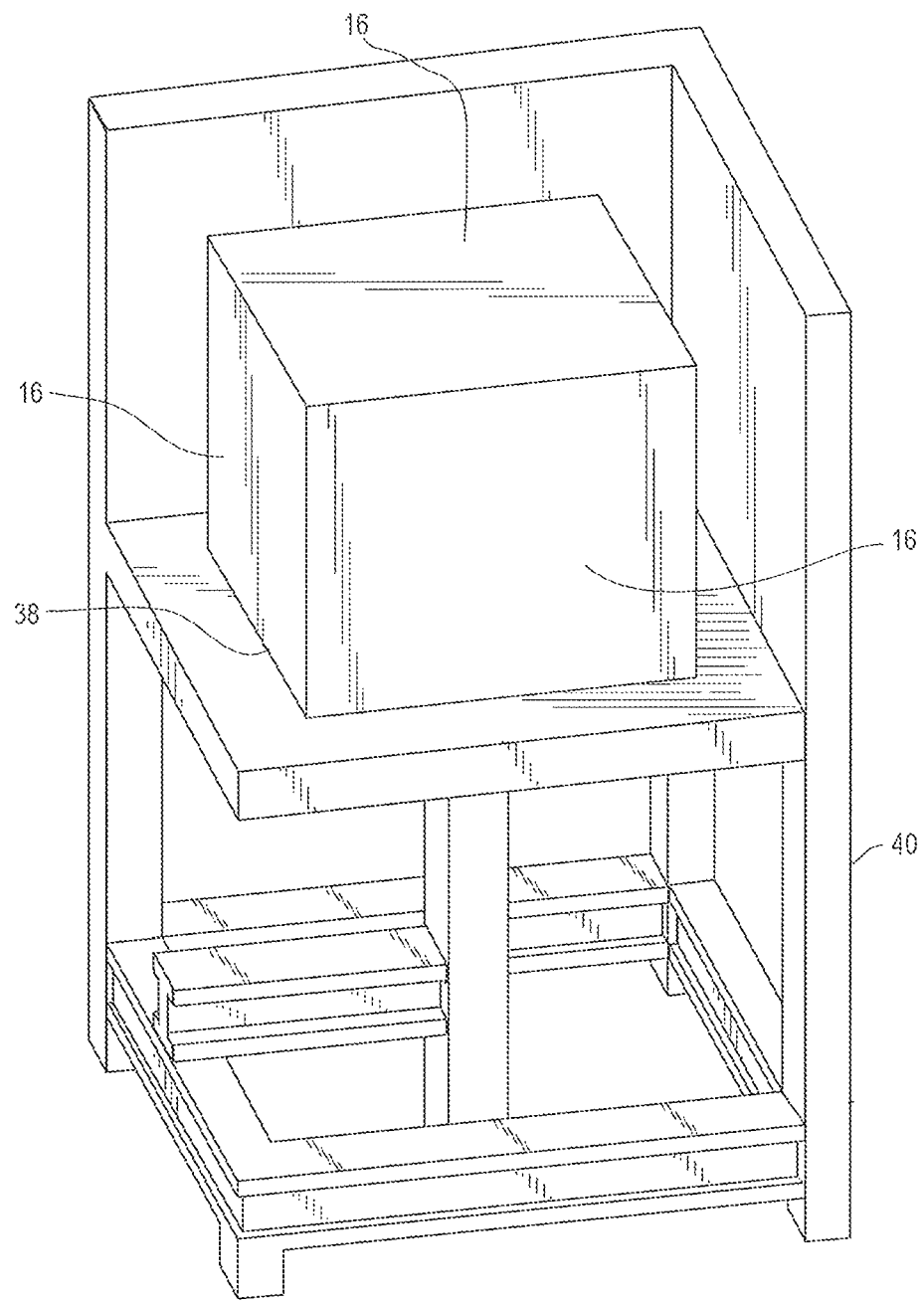
FIG. 5 is a perspective view of part of a tool that may be used to make the thermally insulated sandwich PUR shipper of FIG. 1.
Figure 6:
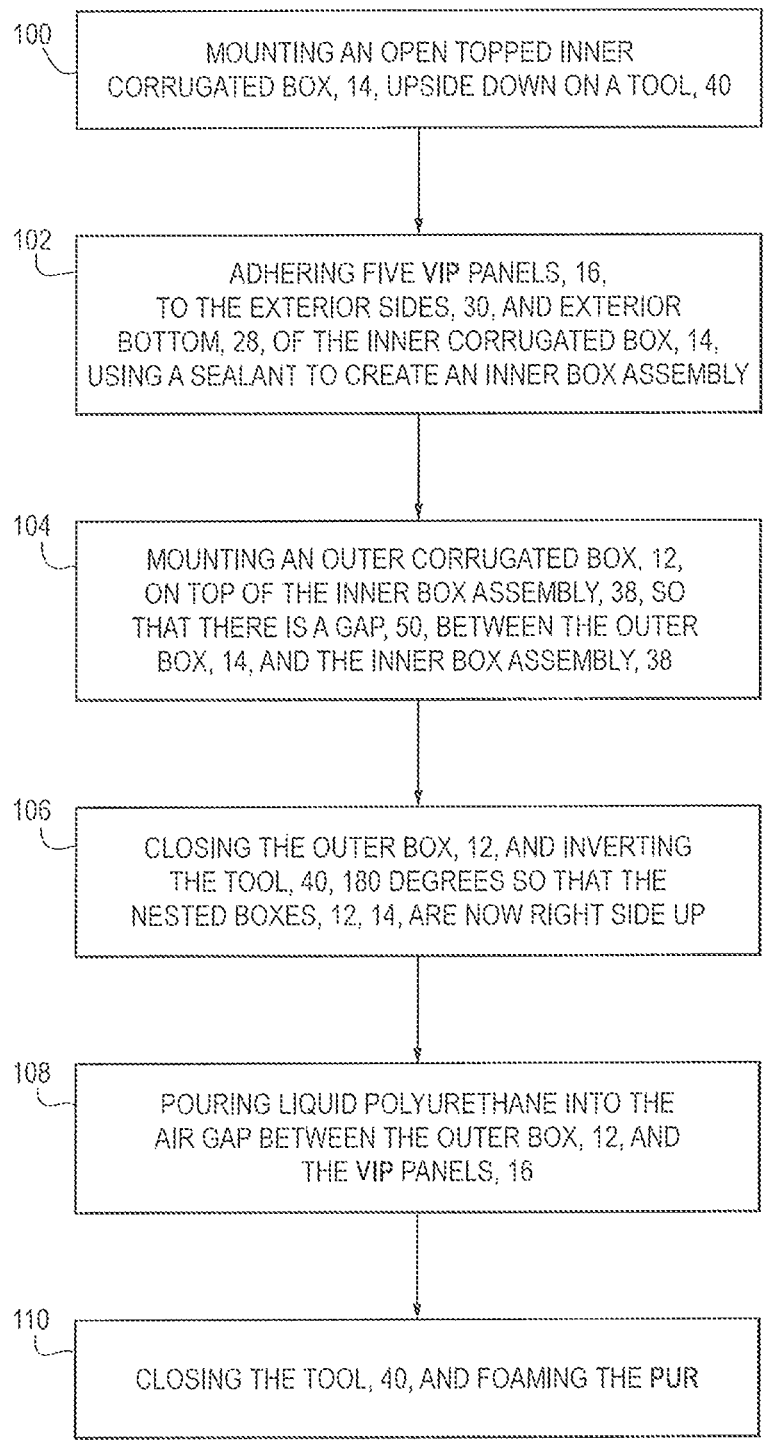
FIG. 6 is a schematic diagram showing a method of making the thermally insulated sandwich PUR shipper of FIG. 1.

The sandwich PUR shipper may be made using a tool 40 such as that shown in FIG. 5. FIG. 6 is a schematic diagram showing a method of making the thermally insulated sandwich PUR shipper 10 of FIG. 1. The method may comprise the following steps:

Step 100: Mounting an inner box 14 upside down on a tool 40.

Step 102: Adhering an insulating panel 16 such as a VIP panel 16 to the exterior (outer box facing) side of each of the inner box bottom 28 and sides 30 using a sealant or other sutiable means to create an inner box assembly 38 such as that shown in FIG. 5. There should be no VIP panel 16 adhered to the top 32 of the inner box 14.

Figure 7:
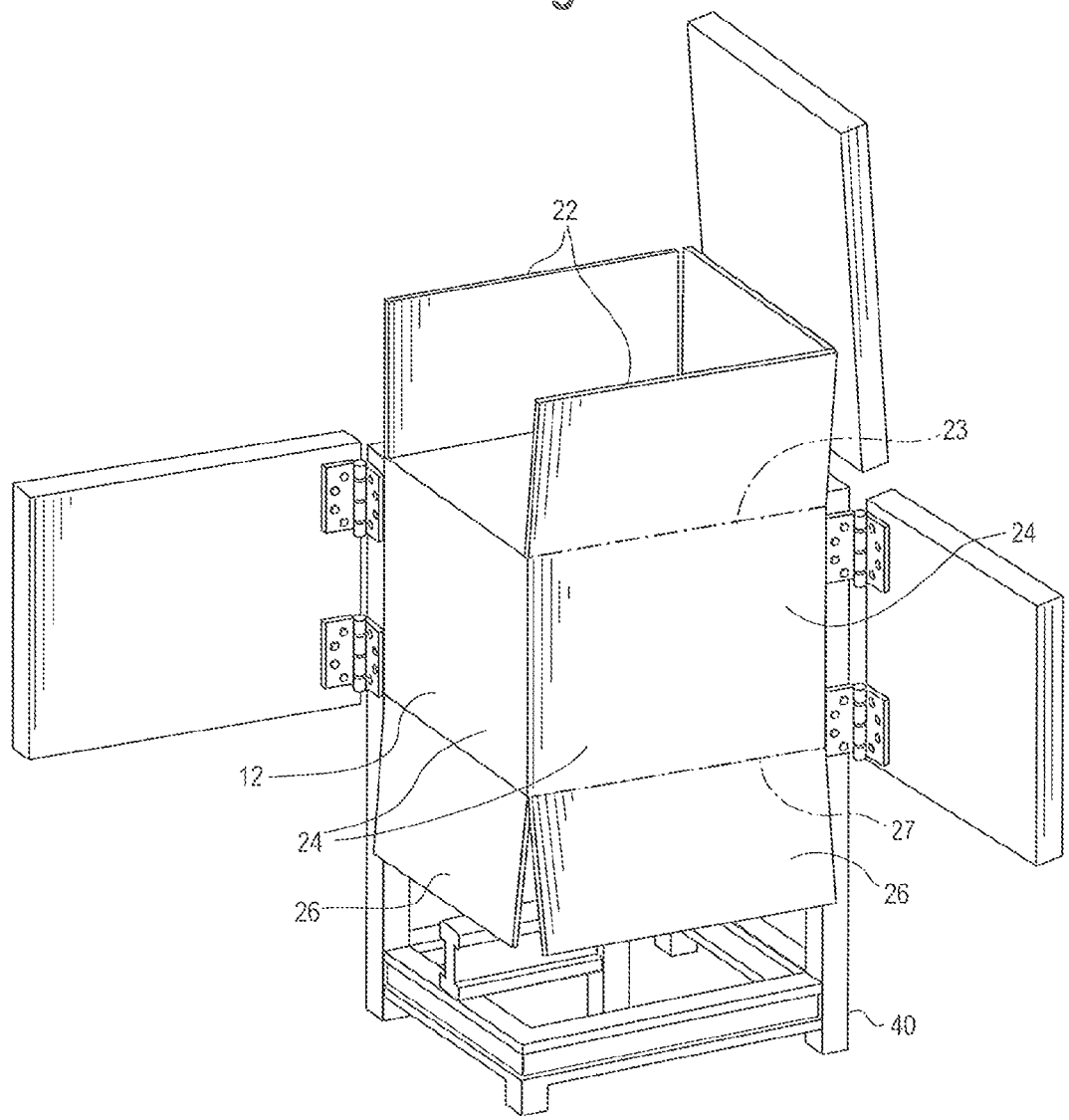
FIG. 7 is a persective view of an outer corrugated box mounted on top of an inner box assembly.

Step 104: Mounting an outer box 12 on top of the inner box assembly 38 as shown in FIG. 7 so that there is a gap 50 (space) between the outer box 12 and the VIP panels 16 or inner box assembly 38. The tool 40 should hold the outer box 12 steady so that it does not contact the inner box assembly 38. The inner box assembly 38 is obscured by the outer box 12 in FIG. 7 but may be seen partially in FIGS. 8 and 10.

Figure 8:
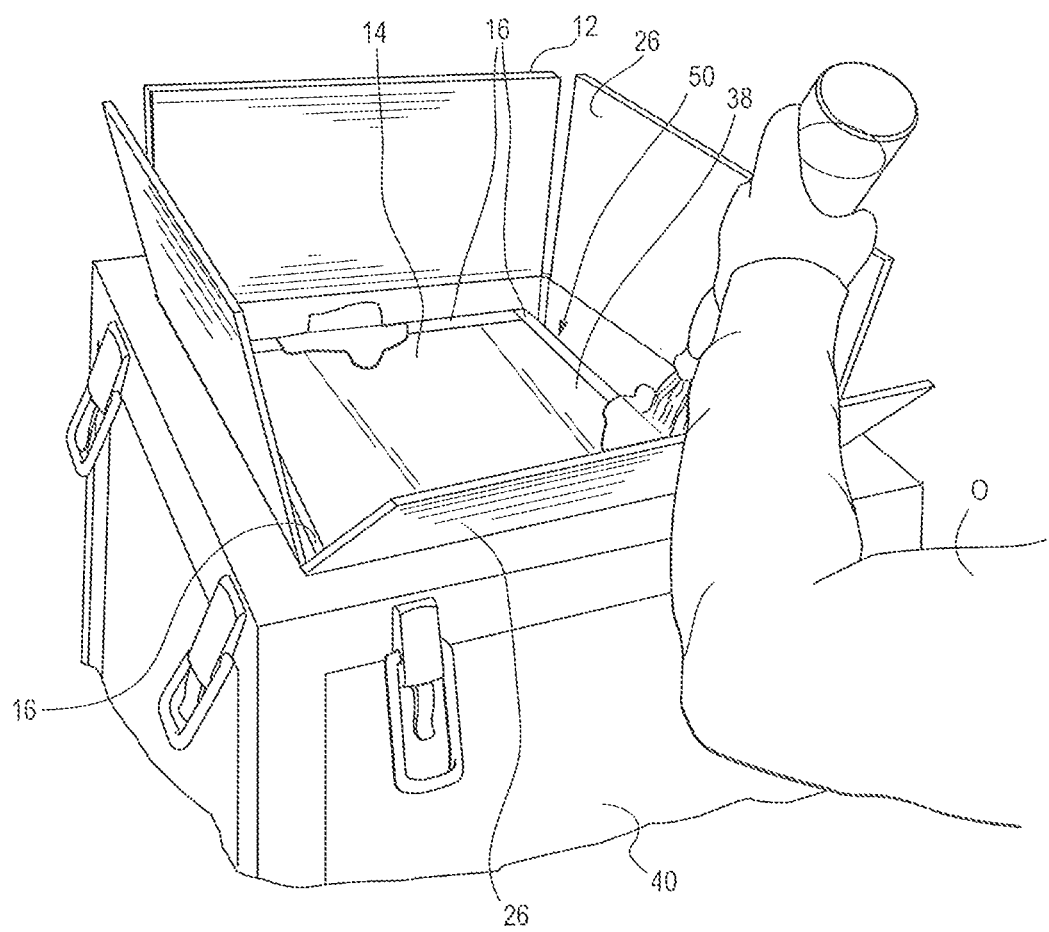
FIG. 8 is a perspective view of an operator pouring liquid polyurethane into the air gap between the outer box and the inner box.

Step 106: Closing the bottom flaps 22 of the outer box 12 and inverting the tool 40 180 degrees so that the nested boxes 12, 14 are now right side up as shown in FIG. 8. The inner box assembly 38, including the inner box 14 and the VIP panels 16 adhered to the sides 30 of the inner box 14, can be seen in FIG. 8 nested within the outer box 12. The outer box 12 is shown with its top flaps 26 open. An operator O is shown in the right forground.

Step 108: Pouring liquid polyurethane into the air gap 50 between the outer box 12 and the VIP panels 16 as shown in FIG. 8. The PUR will settle around the bottom of the outer box 12. The volume of PUR may be about 10% of the volume of the air gap 50.

Figure 9:
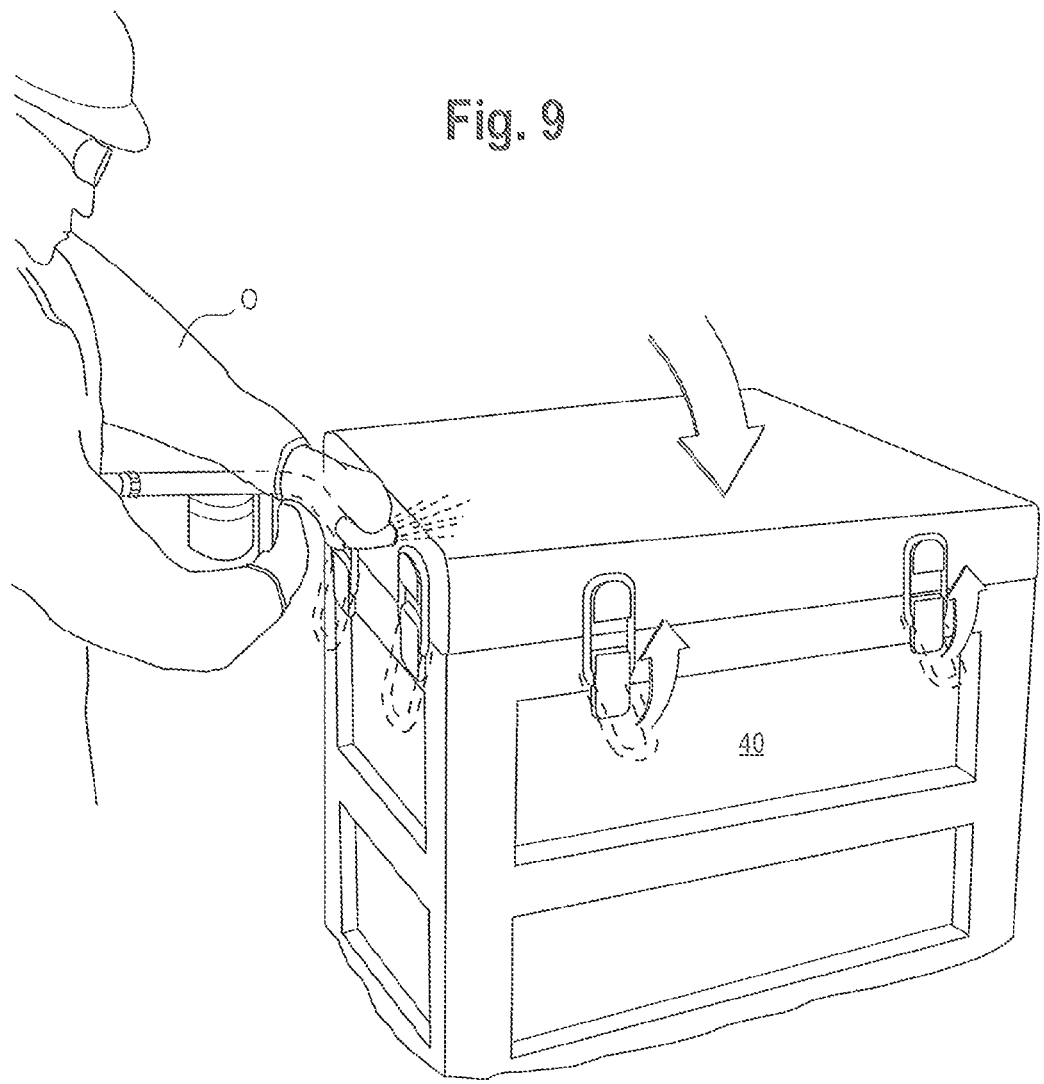
FIG. 9 is a perspective view of an operator closing the tool and foaming the PUR.

Step 110: Closing the tool 40 and foaming the PUR for about 15-30 minutes as shown in FIG. 9. The PUR foam 18 should fill the entire gap 50 between the outer box 12 and the VIP panels 16.

FIG. 10 is a top perspective view of a completed sandwich PUR shipper 10 shown with some of the PUR foam 18 removed for clarity. Preferably, the PUR foam 18 covers the VIP panels 16 to seal off the VIP panels 16 so they are completely enclosed as shown in FIG. 10.

The resulting shipper 10 uses less PUR than conventional shippers and may have improved performance over some conventional PUR shippers.

Case Studies

The following case studies compare performance between a sandwich PUR shipper according to the disclosure and a standard PUR shipper under summer conditions and winter conditions.

Case Study 1—Summer Ambient Profile

In case study 1, the performance of a sandwich PUR shipper was compared to the performance of a standard PUR shipper of identical size. The objective was to maintain the specification pay load (eg. vaccines) between 2-8 degrees C. for a period of 72 hours.

FIG. 11 is a graph comparing the thermal performance of the sandwich PUR shipper according to the disclosure to the standard PUR shipper for a summer ambient profile. The sandwich PUR shipper passed the summer ambient profile test while standard PUR shipper failed after 36 hours.

Case Study 2—Winter Ambient Profile

In case study 2, the performance of a sandwich PUR shipper was compared to the performance of a standard PUR shipper during a winter ambient profile. Again, the objective was to maintain the pay load between 2-8 degrees C. for a period of 72 hours.

FIG. 12 is a graph comparing the thermal performance of the sandwich PUR shipper according to the disclosure to the PUR shipper for a summer ambient profile. The sandwich PUR shipper maintained product temperature within a narrow tolerance while the standard PUR shipper failed to maintain product within the specified temperature range.

Both case studies 1 and 2 confirm that a sandwich PUR shipper according to the present disclosure can exceed the performance of standard PUR shipper. The sandwich PUR shipper is capable of meeting product temperature specification (eg., 2-8 deg C.) irrespective of summer or winter ambient profile.

Case Study 3—Reduction in Size and Weight

The following table compares volume and size reduction achieved by constructing a sandwich PUR shipper according to the present disclosure.

TABLE 1

| Shipper Type | Outer Dimensions, Inches |
| --- | --- |
| Sandwich PUR Shipper | 17.28" × 11.03" × 12.78" |
| Standard PUR Shipper | 20.05" × 14.25" × 16" |

While keeping the insulation value of the overall shipper the same, a sandwich PUR shipper can achieve a 47% reduction in volume and up to a 20% reduction in weight.

INDUSTRIAL APPLICABILITY

The thermally insulated sandwich PUR shipper may be used in any industry where temperature sensitive products are shipped, including but not limited to the pharmaceutical, hospital and food industries.

It is understood that the embodiments of the invention described above are only particular examples which serve to illustrate the principles of the invention. Modifications and alternative embodiments of the invention are contemplated which do not depart from the scope of the invention as defined by the foregoing teachings and appended claims. It is intended that the claims cover all such modifications and alternative embodiments that fall within their scope.

What is claimed is:

1. A packaging system for shipping a temperature sensitive payload, the packaging system comprising:

an outer box;

an inner box nested within the outer box and having a bottom, sides and a top, the inner box defining a payload compartment, the bottom and sides having outer facing surfaces facing away from the payload compartment;

vacuum insulated panels adhered to the outer facing surfaces of the inner box, each vacuum insulated panel being generally rectilinear in shape and comprising flat outer facing and inner facing sides, three substantially flat side edges and a substantially flat top edge; and polyurethane foam located between the vacuum insulated panels and the outer box, the polyurethane foam forming a single unitary structure that covers the top edges of the vacuum insulated panels so the vacuum insulated panels are completely enclosed on the top edges and outer facing sides by the polyurethane foam; wherein the polyurethane foam has an R-value and the vacuum insulated panels have an R-value equal to or greater than the R-value of the polyurethane foam.

2. The packaging system of claim 1 wherein:

the vacuum insulated panels have an R-value about at least twice that of the polyurethane foam.

3. The packaging system of claim 1 wherein:

the vacuum insulated panels are wedged against each other so that a side edge of one vacuum insulated panel abuts an adjacent vacuum insulated panel.

4. The packaging system of claim 1 wherein:

the outer box is made of cardboard; and the inner box is made of cardboard.

* * * * *